United States Patent [19]
Akers

[11] Patent Number: 4,540,943
[45] Date of Patent: Sep. 10, 1985

[54] BELT-SUPPORTED SWINGABLE METAL DETECTOR

[76] Inventor: Oliver C. Akers, 618 11th Ave., Apt. 3, Huntington, W. Va. 25701

[21] Appl. No.: 418,261

[22] Filed: Sep. 15, 1982

Related U.S. Application Data

[63] Continuation-in-part of Ser. No. 309,114, Oct. 6, 1981, abandoned.

[51] Int. Cl.³ .................. G01V 3/11; G01V 3/165; E05D 7/10; A45F 5/00
[52] U.S. Cl. .................................... 324/326; 16/280; 224/224; 248/289.3; 324/327
[58] Field of Search .............................. 324/326–329, 324/252; 16/285, 280, 304, DIG. 36; 224/219, 221, 222, 224, 225, 264, 185; 248/289.1, 290, 289.3

[56] References Cited

U.S. PATENT DOCUMENTS

| | | | |
|---|---|---|---|
| 452,418 | 5/1891 | Thode | 16/280 X |
| 712,843 | 11/1902 | Paul | 224/267 X |
| 774,878 | 11/1904 | Henry | 16/280 |
| 2,504,880 | 4/1950 | Rittenhouse | 224/267 X |
| 3,106,037 | 10/1963 | Harkey | 224/185 X |
| 3,200,528 | 8/1965 | Christensen | 224/185 X |
| 3,792,457 | 2/1974 | Templeton et al. | 324/252 X |
| 4,258,323 | 3/1981 | Andrews et al. | 324/326 X |

FOREIGN PATENT DOCUMENTS 616701 1/1949 United Kingdom ............... 324/327

OTHER PUBLICATIONS

"Metalert Model 70 Metal Detector", Fisher Research Lab., Oct. 1968.
"Metalert Model 70 Valve and Box Locator", Fisher Research Lab., Jan. 1975.

Primary Examiner—Gerard R. Strecker
Assistant Examiner—Warren S. Edmonds
Attorney, Agent, or Firm—Young & Thompson

[57] ABSTRACT

A portable metal detector of the treasure finder type, comprises a shaft on the forward end of which is a conventional detector head. Intermediate the length of the shaft is a handle to be grasped by the user, whose forearm at the elbow rests in an upwardly opening cradle at the rear end of the shaft. Depending from the rear end of the shaft is a squared stud that removably fits in a squared socket held by a double-acting spring to resist horizontal swinging movement of the socket in either direction. The spring and socket are mounted on a bracket on a belt worn by the user, and overlie his hip. In another embodiment, the belt has a projection that supports the detector both when the projection is disposed over the hip and when the projection is centered in front of the user. In that latter case, the uprights forming the cradle have rotatable sleeves thereon that are grasped by the hands of the user to swing the detector from side to side. The shaft can be adjustable in length and can be cranked, so as to accommodate users of different heights.

5 Claims, 9 Drawing Figures

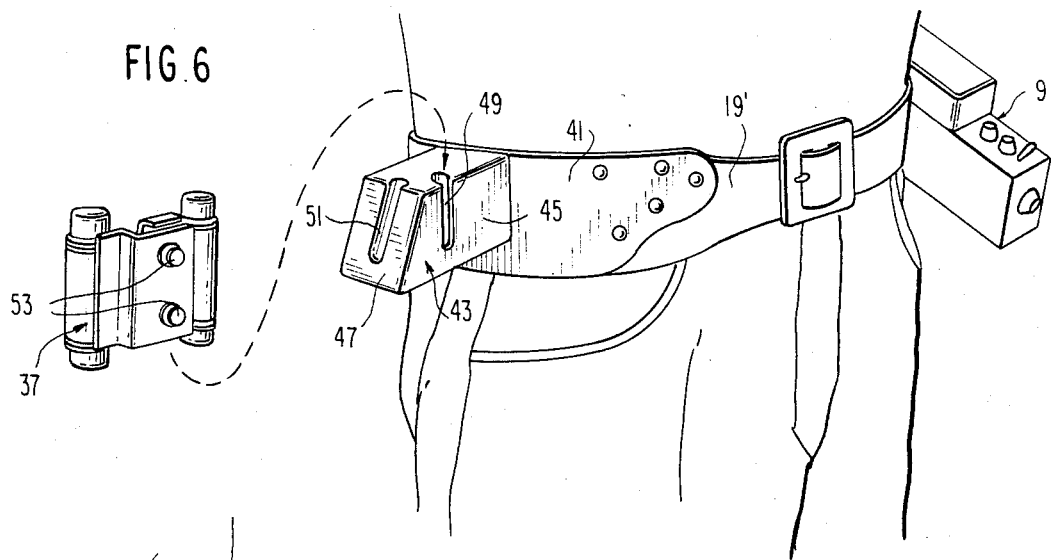
FIG. 6
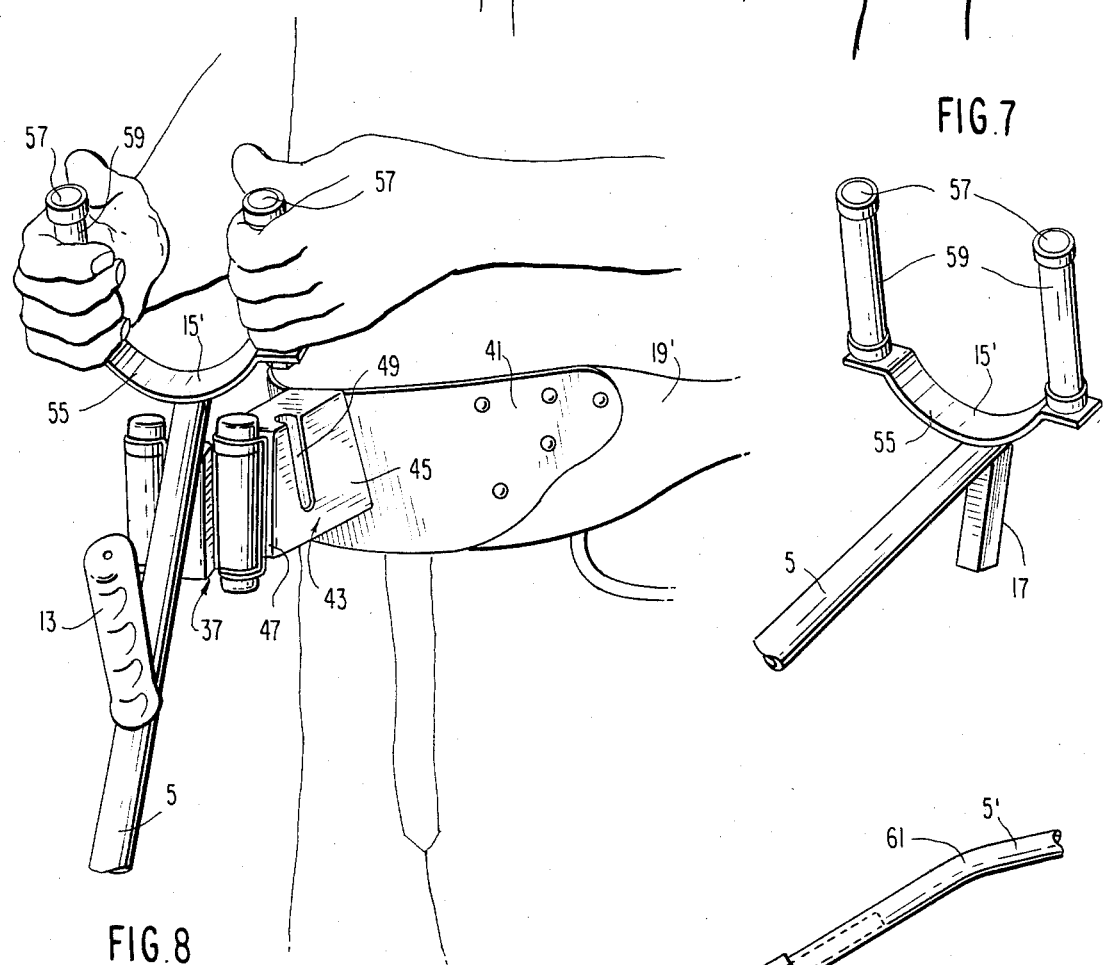
FIG. 7
FIG. 8
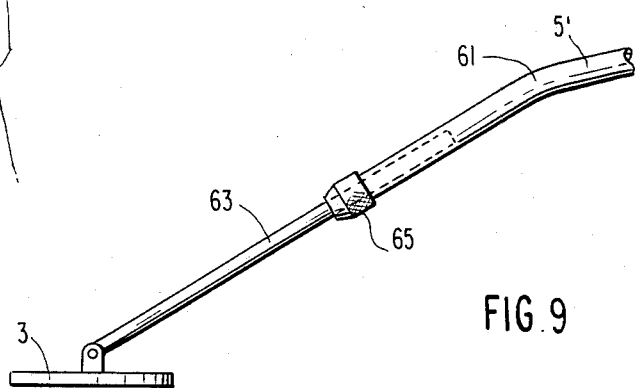
FIG. 9

BELT-SUPPORTED SWINGABLE METAL DETECTOR

This application is a continuation-in-part of my copending application Ser. No. 309,114, filed Oct. 6, 1981, now abandoned.

The present invention relates to portable metal detectors of the treasure finder type, adapted to be carried by an individual and having a detector head that sweeps over the ground to locate subjacent pieces of metal such as coins and the like.

Many such detectors are already known. In general, they are held in the hand of the user, who swings them from side to side as he walks over the terrain to be searched. As is known, the presence of a metallic object so alters the electromagnetic field adjacent the head of the detector, as to cause the equipment to give an audible or a visible signal.

Such detectors suffer from the disadvantage, however, that they cannot be used over a long period of time without tiring the user. The arm, shoulder and neck muscles of the user become strained and cramped, particularly as the device must be not only supported but also swung from side to side, in order to sweep a path of substantial width.

It is accordingly an object of the present invention to provide a portable metal detector which can be used for long periods of time to sweep a wide path, without tiring the user.

Another object of the present invention is to provide a portable metal detector which can be used in either selected one of a pair of different operative positions, at the option of the user.

A further object of the present invention is to provide a portable metal detector which is adaptable to the height of the user.

Finally, it is an object of the invention to provide such a metal detector, which will be relatively simple and inexpensive to construct, easy to assemble and disassemble, simple to operate, and rugged and durable in use.

Briefly, the objects of the present invention are achieved, by mounting an otherwise conventional metal detector on a belt worn by the user, for horizontal swinging movement about an upright axis. A handle on the shaft of the detector is grasped by the user; and a cradle on the end of the shaft receives the forearm of the user adjacent the elbow. Below the cradle, a non-circular post is received in a non-circular socket in a double-acting spring carried by a bracket on a belt worn by the user. The kinetic energy of horizontal swinging movement of the head at the lower end of the shaft, is thus stored in the spring in either direction to assist in the return swing of the detector, so that a minimum of work need be done by the user. The weight of the apparatus is thus largely carried by the belt rather than by the user's muscles; and to help balance the weight, the batteries and controls and visible or audible indicator can be carried on the side of the belt opposite the pivot bracket.

In a preferred embodiment, the belt can be worn in either one of two positions so that the pivotal mounting of the detector is positioned selectively to the front of the user or to the side of the user. When positioned to the side of the user, then the cradle receives the forearm of the user as described above. But when mounted in front of the user, the upright members of the cradle serve instead as handgrips to cause swinging movement of the detector from side to side; and for this purpose, the uprights are provided with rotatable sleeves that are grasped by the user, to reduce the friction between the uprights and the hands of the user. Furthermore, the shaft of the detector can be straight or elbowed, and can be adjustable in length so as to adapt it to the height of the user, by means of a telescoping portion releasably secured by a locknut.

These and other objects, features and advantages of the present invention will become apparent from a consideration of the following description, taken in connection with the accompanying drawings, in which:

FIG. 6 is a view similar to FIG. 2, but showing a modified form of the invention;

FIG. 7 is an enlarged fragmentary perspective view of the rear end of the shaft of the metal detector of FIG. 6;

FIG. 8 is a view similar to FIG. 6 but showing the metal detector seated in its bracket in its position in front of the user; and FIG. 9 is a fragmentary side elevational view of the lower end of the shaft of the metal detector according to another modified form of the invention.

Figure 1:
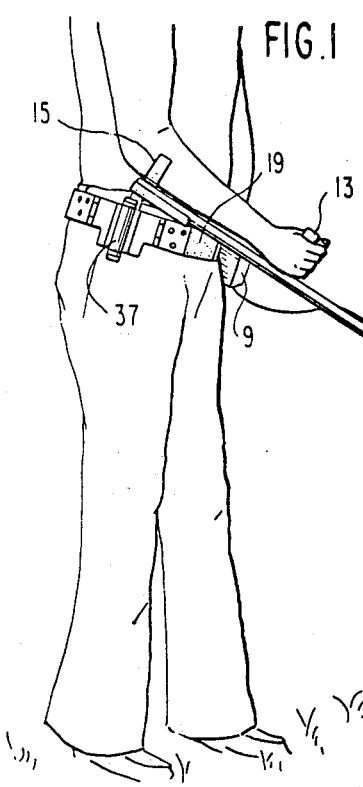
FIG. 1 is a side view of a first embodiment of a swingable metal detector according to the present invention, in use by a person scanning the ground in front of him as he walks forward.

Referring now to the drawings in greater detail, and first to the embodiment of FIGS. 1–5, there is shown a portable metal detector indicated generally at 1, comprising a detector head 3 adapted to generate and measure an electromagnetic field which will be distorted upon the entry thereinto of a metal object, as the user walks with the head 3 a very short distance above the ground. Head 3 is supported on an upwardly inclined shaft 5 about which is trained an electrical conductor 7 that leads to a battery box 9 containing the batteries and controls for the detector and the visible and/or audible indicia that signal the presence of a metal object in the field of head 3. The manual controls for the device are indicated at 11.

As thus far described, the metal detector of the present invention can be entirely conventional and can for example, as to the parts already described, have the form of that disclosed in U.S. Pat. No. 3,769,575, the disclosure of which is incorporated herein by reference.

Figure 3:
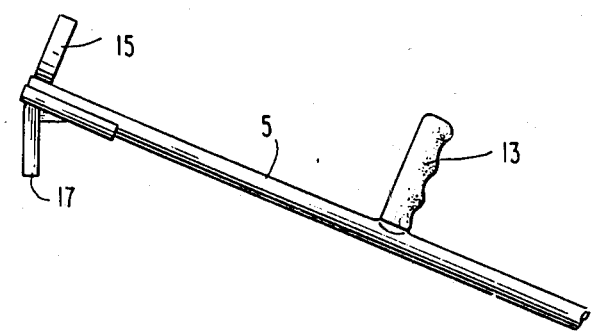
FIG. 3 is a fragmentary side elevational view of the rear end of the shaft of the metal detector of FIG. 1.

The present invention departs from what is known, as to the following:

Intermediate the ends of shaft 5, and closer to the rear end than to the forward end, is an upstanding handle 13 to be gripped by one hand of the user. At the rear end of shaft 5 is an upwardly open cradle 15 of U-shaped configuration, that snugly receives the forearm of the user just below the elbow. On the underside of shaft 5, adjacent cradle 15, is a downwardly depending stud 17 of non-circular cross-sectional configuration, which is square in the illustrated embodiment. Whereas cradle 15 and handle 13 are perpendicular to shaft 5, stud 17 forms an acute angle with shaft 5, as seen in FIG. 3, so that when shaft 5 is downwardly forwardly inclined, stud 17 is vertical.

A belt 19 is provided, comprising a flexible strip 21 of leather, fabric or the like, which encircles the user's waist and is detachably held in place by a conventional buckle 23. Fixedly secured on one side of belt 19, over one of the user's hips, is a bracket 25 comprised by a pair of spaced metal end plates 27 fixedly secured to strap 21 by rivets 29. Hinges 31 interconnect plates 27 with brackets 33 best seen in FIG. 5, which are secured by bolts 35 to a double-acting spring 37. Plates 27 and the portions of brackets 33 that rest against strap 21, are concavely curved to conform generally to the shape of a user's body at the waist. The hinges 31 permit wearers of different sizes to wear belt 19 comfortably.

Swingably secured between the two spring elements of double-acting spring 37, is an upwardly open vertically disposed square socket 39 that detachably receives stud 17 therein. Double-acting spring 37 is conventional in the door art, from which it is well known to comprise two springs, one on either side of socket 39, which yieldably resist swinging movement of socket 39 in either horizontal direction.

In use, the operator straps on belt 19 and picks up the metal detector, grasping handle 13 for this purpose and inserting his forearm adjacent the elbow into cradle 15. With the detector thus positioned, it is an easy matter for the user to insert stud 17 into bracket 39, whereupon the detector is supported by belt 19.

Thereafter, the user can walk across the terrain to be swept, in the FIG. 1 position. The light pressure of the user's elbow keeps stud 17 seated in socket 39, so that the weight of the device is borne more by the user's hips than by his arm and shoulder. Grasping handle 13 and maintaining his forearm in cradle 15, the user can then swing the detector from side to side to sweep an arc of a width of say, six feet as he moves forward at an appropriate pace.

When he swings the detector to one side, one side of double spring 37 is tensioned and the other side relaxed; whereas when he swings the detector to the other side, the reverse takes place. The spring 37 thus stores and releases the kinetic energy of the swinging detector, so that the user need do only a minimum of work.

Notice that the acute angle of stud 17 relative to shaft 5, ensures that the arc followed by head 3 will lie in a plane parallel to the ground. Notice also that the cradle 15 serves not only to locate in a desirable position the user's elbow during operation, but serves also to steady the device when stud 17 is removed from, or more importantly reinserted in, socket 39. Notice further that the positioning of stud 17 directly below cradle 15, ensures that lateral thrust on the user's elbow will be applied only at the axis of swinging movement of the device, as determined by stud 17, with the result that there is no tendency to twist the user's arm at the elbow. Notice still further that battery box 9 and its contents are on the side of belt 19 opposite bracket 25, with the result that the weight of the device tends to be balanced and applied over the user's hips, which results in minimum strain on the user's body.

Turning now to the embodiment of FIGS. 6–8, there is shown in these figures a modified form of the invention in which the detector can be supported for horizontal swinging movement about an upright pivot which is optionally either at the side of the user, as in FIGS. 1–5, or in front of the user. The same parts are present in both instances; but it is a remarkable feature of the present invention that certain of those parts play one function in one position and an entirely different function in the other position.

In FIGS. 6–8, the belt 19 is of modified configuration, including as it does a single rigid belt bracket 41 secured to the flexible belt portion. Bracket 41 has a central outwardly extending projection 43 that has two generally upright faces 45 and 47 thereon. Faces 45 and 47 are provided with upwardly opening downwardly closed bayonet slots 49 and 51, respectively, for the reception of vertically spaced bayonet studs 53 on the rear of the double spring 37, which can otherwise be of the same construction and function as that shown in FIGS. 1–5.

The rear end of the shaft of the metal detector of FIGS. 6–8 is also different from that of FIGS. 1–5, in that the cradle 15' is of a different configuration. Specifically, as best seen in FIG. 7, cradle 15' comprises a metal strap 55 secured to the upper side of the rear end of shaft 5, strap 55 having an upwardly concave configuration that terminates in opposite horizontal ends. To each end of strap 55 is secured an upright spindle 57 on which is rotatably received a cylindrical sleeve 59.

Figure 2:
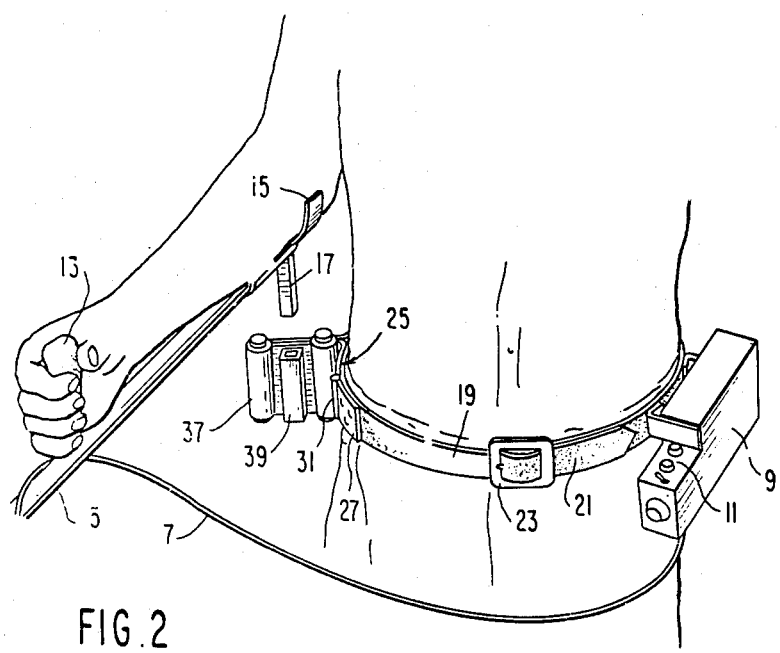
FIG. 2 is a fragmentary front view of the metal detector of FIG. 1 worn by the user, with the post on which the shaft swings raised from its socket.
Figure 5:
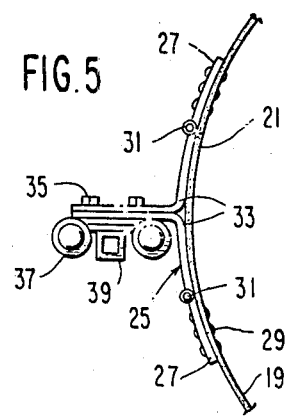
FIG. 5 is a top plan view of the portion of the belt shown in FIG. 4.
Figure 4:
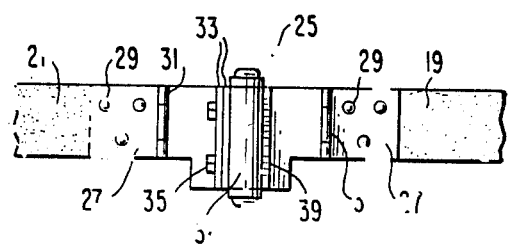
FIG. 4 is a fragmentary side elevational view of the belt of FIG. 1 worn by the user, showing the side thereof that swingably supports the detector shaft.

When belt 19' is worn with projection 43 to one side of the user, corresponding to the position of FIGS. 1 and 2 in the preceding embodiment, then face 45 of projection 43 and its associated bayonet slot 49 are generally upright and facing forward. In this position of the parts, the bayonet studs 53 are inserted from above in slot 49 and the stud 17 on shaft 5 is then inserted in socket 39 of spring 37, after which the device functions as described in connection with FIGS. 1–5. The cradle 15' functions as does the cradle 15, the spindles 57 with their rotatable sleeves 59 thereon cradling between them the forearm of the user just below the elbow, much as shown in FIGS. 1 and 2.

But when it is desired to use the metal detector in a position which is centered forwardly of the user, with the upright axis of horizontal swinging movement positioned immediately in front of the central portion of the user's body, then the belt is worn as in FIG. 8, with the projection 43 centrally in front of the user. Also, in this front position of the device, it is no longer the face 45 that faces forward, but rather the face 47 of projection 43. Also, the slot 49 is not used in this case, but rather the slot 51 is used to receive the bayonet studs 53 from above. The assembled device then has the appearance shown in FIG. 8.

Notice that face 47 with its associated slot 51 is not upright in the FIG. 6 position, but rather is inclined forwardly downwardly. This feature is provided, so that the face 47 and slot 51 will in fact be upright when they support the cantilevered weight of the metal detector in the FIG. 8 position. In other words, when the device is worn in the front position of FIG. 8, bracket 41 rests against a relatively soft portion of the user's body and the projection 43 has a tendency to tilt downwardly under the weight of the detector, thereby tilting face 47 and slot 51 from the inclined position shown in FIG. 6, to a more nearly vertical position. But when the device is worn with projection 43 to the side, then the belt is supported against such twisting movement by the relatively unyielding pelvis of the user; and for this reason, face 45 and slot 49 can be more nearly upright in the unloaded position of FIG. 6, than can face 47 and slot 51.

With the device mounted in the front position shown in FIG. 8, the spindles 57 now take on a new function: they are grasped by the hands of the user, one in each hand, who uses them to swing the device from side to side. Thus, in the front-mounted position of FIG. 8, the handle 13 is no longer used, but rather the spindles 57 are used, one in each hand. Specifically, the hands of the user grasp the relatively rotatable sleeves 59, which, upon swinging movement of the detector from side to side, oscillate on their respective spindles 57, thereby avoiding frictional movement against the hands of the user.

Thus, the same cradle structure 55–59 which cradles the forearm of the user in the side-mounted position of the device, serves the entirely different function of providing operating handles for the device in the front-mounted position thereof.

FIG. 9 shows a fragment of a modified form of detector. In FIG. 9, the shaft 5' is provided with an elbow 61 intermediate its length and is hollow. An extension 63 telescopes within the lower end of shaft 5', below elbow 61, and can be selectively locked in any desired extended position by manipulation of a knurled locknut 65. In this way, the height of the head 3 above the ground can be predetermined regardless of the height of the user.

FIG. 9 illustrates the possibility of using an elbowed shaft as well as a telecopically extensible shaft. Of course, it is not necessary to use both of these features: the shaft can be elbowed and not telescopic, or it can be straight and telescopic, as well as elbowed and telescopic as shown in FIG. 9. Indeed, for a straight shaft, it is preferred that such a shaft be extensible as at 63, 65, for otherwise the shaft would tend not to be long enough for use by a relatively tall user.

From a consideration of the foregoing disclosure, therefore, it will be evident that the initially recited objects of the present invention have been achieved.

Although the present invention has been described and illustrated in connection with preferred embodiments, it is to be understood that modifications and variations may be resorted to, without departing from the spirit of the invention, as those skilled in this art will readily understand. Such modifications and variations are considered to be within the purview and scope of the present invention as defined by the appended claims.

What is claimed is:

1. A swingable metal detector, comprising an elongated shaft, a detector head for sensing metal at one end of the shaft, a handle intermediate the length of the shaft, a belt worn by the user, means at the end of the shaft opposite the detector head for swingably mounting the shaft on the belt for horizontal swinging movement relative to the belt, and a bracket on the belt, said bracket having two different sockets for removably mounting the shaft on the belt, one said socket being on the side of the bracket which faces forwardly when the belt is worn with the bracket on one lateral side of the user's body so as removably to receive said mounting means when the shaft is disposed on one side of the user's body, and the other said socket being on the side of the bracket which faces forwardly when the belt is worn with the bracket in front of the user's body so as removably to receive said mounting means when the shaft is supported in front of the user's body.

2. A detector as claimed in claim 1, and an upwardly open cradle at said opposite end of the shaft to receive and releasably retain the forearm of the user when the detector is mounted on one side of the user, said cradle having upright members between which the user's forearm is cradled in said side mounted position, said upright members serving as handles to swing the shaft when the detector is worn in said front position.

3. A detector as claimed in claim 2, said upright members including rotatable sleeves to be grasped by the hands of the user in said front position of the detector.

4. A detector as claimed in claim 1, and spring means that yieldably resist swinging movement of the shaft in either horizontal direction.

5. A swingable metal detector, comprising an elongated shaft, a detector head at one end of the shaft, a handle intermediate the length of the shaft, a belt worn by the user, and means at the end of the shaft opposite the detector head for swingably mounting the shaft on the belt for horizontal swinging movement relative to the belt, said mounting means comprising a stud that depends from said shaft at an acute angle to the shaft and is swingably disposed in a socket carried by the belt, said socket being open at its upper end, and said stud being freely insertable in and removable from said socket by vertical movement of said stud relative to said socket.

* * * * *